United States Patent
Sasaki et al.

(10) Patent No.: US 9,023,904 B2
(45) Date of Patent: May 5, 2015

(54) POLYPROPYLENE RESIN FOAM PARTICLE AND MOLDING THEREOF

(75) Inventors: Hidehiro Sasaki, Kawachi-gun (JP); Masaharu Oikawa, Yokkaichi (JP); Tokunobu Nohara, Yokkaichi (JP)

(73) Assignee: JSP Corporation, Tokyo (JP)

( * ) Notice: Subject to any disclaimer, the term of this patent is extended or adjusted under 35 U.S.C. 154(b) by 714 days.

(21) Appl. No.: 12/451,919

(22) PCT Filed: May 14, 2008

(86) PCT No.: PCT/JP2008/058830
§ 371 (c)(1), (2), (4) Date: Dec. 7, 2009

(87) PCT Pub. No.: WO2009/001626
PCT Pub. Date: Dec. 31, 2008

(65) Prior Publication Data
US 2010/0105787 A1    Apr. 29, 2010

(30) Foreign Application Priority Data

Jun. 22, 2007 (JP) ................................. 2007-164724

(51) Int. Cl.
| | |
|---|---|
| C08F 10/06 | (2006.01) |
| C08J 9/00 | (2006.01) |
| C08J 9/12 | (2006.01) |
| C08J 9/18 | (2006.01) |
| C08J 9/232 | (2006.01) |
| C08F 110/06 | (2006.01) |
| C08F 210/06 | (2006.01) |

(52) U.S. Cl.
CPC ............. *C08J 9/122* (2013.01); *C08F 110/06* (2013.01); *C08F 210/06* (2013.01); *C08J 9/0061* (2013.01); *C08J 9/18* (2013.01); *C08J 9/232* (2013.01); *C08J 2323/12* (2013.01); *C08J 2423/00* (2013.01)

(58) Field of Classification Search
CPC ............ C08J 9/0061; C08J 9/122; C08J 9/18; C08J 9/232; C08J 2323/12; C08J 2423/00; C08F 110/06; C08F 210/06
USPC .................. 521/134, 142, 143, 144; 525/240
See application file for complete search history.

(56) References Cited

U.S. PATENT DOCUMENTS

| | | | |
|---|---|---|---|
| 3,770,663 A | | 11/1973 | Ueki et al. |
| 4,777,000 A | | 10/1988 | Kuwabara et al. |
| 5,968,430 A | | 10/1999 | Naito et al. |
| 6,013,687 A | * | 1/2000 | Wirobski et al. ............... 521/60 |
| 6,326,409 B1 | | 12/2001 | Mihayashi et al. |
| 2003/0034580 A1 | | 2/2003 | Sasaki et al. |
| 2007/0270516 A1 | | 11/2007 | Iwamoto et al. |

FOREIGN PATENT DOCUMENTS

| | | |
|---|---|---|
| EP | 0 611 795 B2 | 7/2003 |
| JP | B2-49-2183 | 1/1974 |
| JP | B2-56-1344 | 1/1981 |
| JP | B2-62-61227 | 12/1987 |
| JP | B2-4-46217 | 7/1992 |
| JP | B2-6-49795 | 6/1994 |
| JP | A-6-240041 | 8/1994 |
| JP | A-9-104026 | 4/1997 |
| JP | A-9-104027 | 4/1997 |
| JP | A-10-180888 | 7/1998 |
| JP | A-10-292064 | 11/1998 |
| JP | A-2000-894 | 1/2000 |
| JP | A-2000-198872 | 7/2000 |
| JP | A-2001-131327 | 5/2001 |
| JP | A-2001-341151 | 12/2001 |
| JP | A-2005-298769 | 10/2005 |
| JP | A-2006-22138 | 1/2006 |
| JP | A-2006-69143 | 3/2006 |
| JP | A-2006-96805 | 4/2006 |
| WO | WO 02/100929 A1 | 12/2002 |
| WO | WO 2006/016478 * | 2/2006 |
| WO | WO 2006/016478 A1 | 2/2006 |

OTHER PUBLICATIONS

International Search Report issued in International Application No. PCT/JP2008/058830; Mailed Aug. 5, 2008.

* cited by examiner

*Primary Examiner* — Irina S Zemel
(74) *Attorney, Agent, or Firm* — Oliff PLC (57) ABSTRACT

A polypropylene resin foamed bead from which a foamed bead molded article excelling in appearance, heat resistance and mechanical properties can be obtained at the molding temperature lower than that for conventional polypropylene resin foamed beads; and a foamed bead molded article obtained by molding the same. The polypropylene resin foamed bead is characterized by having such a crystal structure that in the first DSC curve obtained when the temperature of the foamed bead sample is raised from ordinary temperature to 200° C. at a temperature rising rate of 2° C./min by a differential scanning calorimetry, there appear a main endothermic peak of 100° to 140° C. endothermic peak apex temperature exhibiting 70 to 95% endothermic peak calorific value based on the total endothermic peak calorific value and two or more endothermic peaks exhibited on the high temperature side with respect to the main endothermic peak.

16 Claims, 2 Drawing Sheets

POLYPROPYLENE RESIN FOAM PARTICLE AND MOLDING THEREOF

BACKGROUND OF THE INVENTION

1. Field of the Invention

The present invention relates to a polypropylene resin foamed bead and a molded article of the foamed beads, and, particularly, to a polypropylene resin foamed bead which can form a foamed bead molded article superior in appearance, heat resistance and mechanical properties at a molding temperature lower than the molding temperature of conventional polypropylene resin foamed beads and to a foamed bead molded article obtained by molding the polypropylene resin foamed beads.

2. Description of the Prior Art

Polypropylene resins are superior in characteristics such as mechanical strength, heat resistance, processability, incineration properties and recycling characteristics, and their fields of applications are growing widely. Polypropylene resin foamed bead molded article obtained by molding of polypropylene resin foamed beads can further shock-absorbing property, insulation property and light-weight characteristics without losing the above excellent natures of polypropylene resins and are being widely used for packaging materials, construction materials and impact absorption materials for vehicles.

Polypropylene resin foamed bead molded articles obtained by filling polypropylene resin foamed beads in a mold and by carrying out expanding and fuse-bonding operations using heating steam and the like are superior in heat resistance, chemical resistance, toughness and compression strain recovery characteristics to polystyrene resin foamed molded articles to be used in similar applications. On the contrary, heating at a higher temperature, that is, heating using steam having a higher saturated vapor pressure than in the case of the molding of polystyrene resin foamed beads is required to secondary expansion the polypropylene resin foamed beads (hereinafter referred to as secondary expanding) and also to carryout the fusion among beads in molding. For this, it is necessary to prepare a mold which meets application requirements for high-pressure resistance and a molding machine specified for high press pressure, which increases the energy cost to be used.

In order to solve such problems, Patent Reference 1, for example, proposes that the surface of polypropylene resin foamed beads is coated with a different resin having a low-melting point. However, the equipment used for this coating is complicated and also, the process is complicated. Also, though the fusion ability among famed beads during molding is improved, the secondary expanding characteristics of foamed beads are insufficient. Therefore, the molded article has unsatisfactory appearance and there is a room for an improvement in appearance. In order to solve these problems, it is necessary to provide an inner pressure applying process for raising the inner pressure in the foamed beads, to enable molding under a high compressive ratio or to raise the molding pressure, for the purpose of raising the secondary expanding ability of the foam particles.

There is a method using a polypropylene resin having a relatively low melting point as its base resin in order to drop the molding temperature of foamed beads in molding. As shown in Patent Reference 2, polypropylene resin foamed beads are known which are produced by using, as its base resin, a polypropylene resin polymerized using a metallocene type polymerization catalyst. As the polypropylene resin polymerized by using this metallocene type polymerization catalyst, a resin having a lower melting point than a usual polymer produced using a Ziegler-Natta type catalyst is easily obtained. However, there is much room for improvements in the effect of dropping the saturated vapor pressure of the steam required as the heating medium in the molding, the appearance of the foamed bead molded article obtained by the molding and molding stability such as the mutual fusibility of the foamed beads.

Also, as shown in Patent Reference 3, non-crosslinked foamed beads containing, as the base resin, a modified polypropylene resin is known which is obtained by impregnating a polypropylene resin with a vinyl monomer, followed by graft polymerization and in which the ratio of "content of a polypropylene resin"/"content of a polymer of a vinyl monomer" is 97 to 65% by weight/3 to 35% by weight. The heat resistance of the foamed beads obtained by impregnating the polypropylene resin particles with a vinyl monomer, followed by graft polymerization tends to be dependent on the transition of state, such as melting point or glass transition temperature, specific to a polymer. It is therefore considered to be able to drop the saturated vapor pressure of steam in molding by selecting a polypropylene resin having a low melting point. However, this poses a problem in the point of keeping heat resistance.

Patent Reference 4 proposes a method in which two types of polypropylene resins differing in melting point are mixed. In this Patent Reference, for example, a polypropylene resin foamed bead is reported which has an expansion ratio of 10 to 50 and contains, as its base resin, a polypropylene resin which is obtained by mixing two types of polypropylene resins differing in melting point by 15° C. or more and 30° C. or less and has a melt index of 3 g/10 min or more and 20 g/10 min or less. However, heating temperature exceeding 140° C. is still required for the molding of the proposed polypropylene resin foamed beads and steam having a high saturated vapor pressure is used.

Patent Reference 5 discloses that a polypropylene resin foamed bead molded article which has a specified endothermic peak and an endothermic temperature and has the specified relation between the endothermic peak temperature and endothermic calorific value is a high-density foam which has a uniform cell diameter and good appearance and has low heat conductivity. However, the foamed beads and molded article described in Patent Reference 5 are respectively only a type which has one endothermic peak at the high-temperature side of the main endothermic peak on the first DSC curve obtained by measuring heat flux differential scanning calorific value which will be explained later in the present invention, and it is difficult to obtain a foamed bead molded article having stable and excellent properties by molding at a low molding temperature.

Patent Reference 1: JP-A No. 2000-894
Patent Reference 2: JP-A No. 6-240041
Patent Reference 3: JP-A No. 10-292064
Patent Reference 4: JP-A No. 2006-96805
Patent Reference 5: JP-A No. 2001-341151

DISCLOSURE OF THE INVENTION

Problems to be Solved by the Invention

It is an object of the present invention to provide polypropylene resin foamed beads which obtain a polypropylene resin foamed beads molded article having stable and excellent properties is obtained without impairing excellent natures such as toughness, heat resistance, incineration properties and recycling characteristics, which are specific to a polypropylene resin foamed bead molded article, by molding at a lower heating temperature.

Another object of the present invention is to provide polypropylene resin foamed beads having a specific crystal structure, the resin foam particles having a moldable temperature range more broadened to the low-temperature side than a current foamed beads in molding and being superior in secondary foaming ability in low temperature and mutual fusibility of foamed beads.

A further object of the present invention is to provide a foamed bead molded article which is superior in the mutual fusibility of foamed beads, mechanical properties such as compressive strength and in flexibility.

Means to Solve the Problems

The inventors of the present invention have made earnest studies as to the relation between the crystal structure of the foamed beads and the mechanical properties of the molded article and the relation between the crystal structure of the foamed beads and the behavior of the foamed beads in molding with the intention of developing polypropylene resin foamed beads which are superior in the mutual fusibility of the foamed beads and mechanical properties such as compressive strength and has flexibility without impairing the characteristics usually obtained when a conventional polypropylene resin foamed beads molded article is used, at a temperature lower than the molding temperature of the conventional polypropylene resin foamed bead, as a result, found that a formed beads molded article having stable and excellent properties with a realization of the fact that a moldable temperature range of the molding of the foamed beads is broadened to the low-temperature side by adjusting the crystal structure of the foamed beads, and thus the present invention has been completed.

The present invention relates to a polypropylene resin foamed bead having a specific crystal structure as shown below and to a molded article of the polypropylene resin foamed beads.

Accordingly, the present invention relates to:

(1) A polypropylene resin foamed bead having a crystal structure which indicates a main endothermic peak exhibiting an endothermic peak calorific value of 70 to 95% of the total endothermic peak calorific value and having an apex temperature of 100 to 140° C. and two or more endothermic peaks on the high-temperature sides of the main endothermic peak on the first DSC curve obtained when the polypropylene resin foamed bead is heated from normal temperature to 200° C. at a temperature rise rate of 2° C./min by heat flux differential scanning calorimetry.

Also, the summary of the present invention is as follows:

(2) A polypropylene resin foamed bead according to the above (1), wherein the apex temperature of the above main endothermic peak is 105 to 135° C.;

(3) A polypropylene resin foamed bead according to the above (1), wherein the apex temperature of the above main endothermic peak is 110° C. or more and less than 125° C.;

(4) A polypropylene resin foamed bead according to the above (1), wherein the polypropylene resin constituting the above polypropylene resin foamed bead comprised of a polypropylene resin produced by polymerizing using a metallocene type polymerization catalyst;

(5) A polypropylene resin foamed bead according to the above (1), wherein the polypropylene resin constituting the above polypropylene resin foamed bead is composed of a mixture of plural polypropylene resins;

(6) A polypropylene resin foamed bead according to the above (5), wherein the polypropylene resin which is the base resin constituting the above polypropylene resin foamed bead is composed of a mixture of a low-melting point polypropylene resin (A) having a melting point of 100 to 140° C. and a high-melting point polypropylene resin (B) having a melting point higher by 25° C. or more than that of the above resin (A);

(7) A polypropylene resin foamed bead according to the above (5), wherein the polypropylene resin which is the base resin constituting the above polypropylene resin foamed bead is composed of a mixture of a low-melting point polypropylene resin (A) having a melting point of 100 to 140° C. and a high-melting point polypropylene resin (B) having a melting point higher by 30° C. or more than that of the above resin (A);

(8) A polypropylene resin foamed bead according to the above (5), wherein the polypropylene resin which is the base resin constituting the above polypropylene resin foamed bead is composed of a mixture of a low-melting point polypropylene resin (A) having a melting point of 105 to 130° C. and a high-melting point polypropylene resin (B) having a melting point higher by 25° C. or more than that of the above resin (A);

(9) A polypropylene resin foamed bead according to any one of the above (6), (7) and (8), wherein among the base resins constituting the above polypropylene resin foamed bead, the low-melting point polypropylene resin (A) is a copolymer of propylene and ethylene or/and an α-olefin having 4 to 20 carbon atoms;

(10) A polypropylene resin foamed bead according to any one of the above (6), (7) and (8), wherein among the base resins constituting the above polypropylene resin foamed bead, the low-melting point polypropylene resin (A) is polymerized by using a metallocene type polymerization catalyst;

(11) A polypropylene resin foamed bead according to any one of the above (6), (7) and (8), wherein the mixing ratio (A/B) by weight of the low-melting point polypropylene resin (A) to the high-melting point polypropylene resin (B) which are the base resins constituting the above polypropylene resin foamed bead is 98/2 to 90/10;

(12) The polypropylene resin foamed bead according to the above (1) or (5), wherein among the two or more endothermic peaks which appear on the high-temperature side of the above main endothermic peak, the endothermic calorific value of the endothermic peak derived from the propylene resin component forming the main endothermic peak is 2 to 15 J/g; and (13) A polypropylene resin foamed beads molded article produced by molding the polypropylene resin foamed beads according to the above (1) or (5) by in-mold molding.

Effect of the Invention

The polypropylene resin foamed beads of the present invention having the crystal structure exhibiting the above thermal characteristics has a moldable temperature range more broadened to the low-temperature side than a current polypropylene resin foamed bead in molding and is superior in secondary foaming ability and mutual fusibility of foamed beads. Therefore, a foamed bead molded article superior in appearance and mechanical properties is stably obtained by molding of the foamed beads.

Therefore, the polypropylene resin foamed beads of the present invention enables such an molding process which is carried out at a low heating temperature, and in other words, under heating using steam having a low saturated vapor pressure, and which is scarcely attained using current polypropylene resin foamed beads. This makes it possible, for example, to drop the clamping pressure of a molding machine and to reduce the thickness of a mold, so that the molding machine and mold are each allowed to only meet the application requirements for low-pressure molding. This also enables inexpensive designing of molding assemblies and also, the production of a molding by heating using steam having a lower pressure than in the case of the molding of a current polypropylene resin foamed bead can be realized, and therefore, a remarkable reduction in energy cost during the course of molding can be realized.

Further, since the foamed beads of the present invention enables the production of a foamed bead molded article more flexible than a current polypropylene resin foamed bead molded article, a usable molding is obtained either without any troublesome processing for complicated die cut products and applications which need processing such as bending processing or by simplifying these processings.

BRIEF DESCRIPTION OF THE DRAWINGS

FIGS. 1 and 2 are DSC curves showing the thermal characteristics of polypropylene resin foamed beads according to the present invention, wherein

FIGS. 3A and 3B are views for explaining a flexibility test for a foamed bead molded article, wherein

EXPLANATIONS OF THE SYMBOLS

α: Point corresponding to 80° C. on the DSC curve
β: Point corresponding to the melt completion temperature on the DSC curve
γ: Valley part between the low-temperature side peak and the high-temperature side peak
δ: Intersection of the line α-β with a line extended from γ perpendicularly to the line α-β
Te: Melt completion temperature
$a_1$: Main endothermic peak
$a_2$: Endothermic peak on the high-temperature side of the main endothermic peak
$a_3$: Endothermic peak on the high-temperature side of the main endothermic peak
TmA, PTmA: Apexes of the main endothermic peak
ΔHa: Main endothermic peak calorific value
ΔHb: Endothermic peak calorific value of the endothermic peak $a_2$
ΔHc: Endothermic peak calorific value of the endothermic peak $a_3$

DETAILED DESCRIPTION OF THE PREFERRED EMBODIMENT

Foamed beads according to the present invention enable molding at a lower molding temperature than in the case of the molding using a current polypropylene resin foamed beads and also enable stable formation of a foamed molded article superior in appearance and in mutual fusibility among foamed beads. The foamed beads of the present invention has a crystal structure which has a main endothermic peak exhibiting an endothermic peak calorific value of 70 to 95% of the total endothermic peak calorific value and having an apex temperature of 100 to 140° C., and two or more endothermic peaks on the high-temperature sides of the main endothermic peak on the first DSC curve obtained when the polypropylene foam particles are raised from normal temperature to 200° C. at a temperature rise rate of 2° C./min by heat flux differential scanning calorimetry.

The foamed beads of the present invention are characterized by the feature that a main endothermic peak having an apex temperature of 100 to 140° C. appears on the first DSC curve and the apex temperature of the main endothermic peak is close to the melting point of a polypropylene resin which is a base resin of the foamed beads. Therefore, the foamed beads of the present invention may be said to be a non-crosslinked polypropylene resin foamed beads made of a low-melting point polypropylene resin. However, foamed beads only made of a low-melting point polypropylene resin are not satisfied in the effect of dropping the heating temperature during the course of molding, the appearance of a foamed bead molded article obtained by molding and molding stability such as the mutual fusibility among foamed beads and is therefore necessarily improved.

In light of this, the inventors of the present invention have obtained the following findings.

Specifically, foamed beads to be used for molding include a type having such a nature that they are first put into a mutually fusible state and then, in a secondary expandable state by heating (hereinafter, foamed beads having this nature are referred to as fusion preceding type foamed beads), and a type having such a nature that they are first put into a secondary expandable state and then, in a mutually fusible state by heating (hereinafter, foamed beads having this nature are referred to as secondary foaming preceding type foamed beads). The inventors of the present invention have obtained such findings that the fusion preceding type foamed beads are more desirable than the secondary foaming preceding type foamed beads particularly in molding at a low heating temperature. Then, the inventors of the present invention have found by further studies that when the foamed beads have a crystal structure in which two or more endothermic peaks appear on the high-temperature side of the main endothermic peak on the first DSC curve of the foamed beads, foamed beads which are the secondary foaming preceding type foamed beads made of a current low-melting point polypropylene resin is changed to the fusion preceding type foamed beads, giving the effect of dropping the heating temperature during the molding process and excellent molding stability. Therefore, it is important structural requirements for the foamed beads of the present invention that the foamed beads have a crystal structure in which two or more endothermic peaks appear on the high-temperature side of the main endothermic peak.

The reason why the fusion preceding type foamed beads are more preferable than the secondary foaming preceding type foamed beads is that in the case of the secondary foaming preceding type foamed beads, clearances formed between foamed beads filled in a mold are easily buried by the secondary foaming of the foamed beads in the heating step during the course of the molding, which inhibits the inflow and passage of steam into these clearances, with result that this is a cause of a hindrance to the mutual fusion of the foamed beads, whereas in the case of the fusion preceding type foamed beads, the cause of such a hindrance as those seen in the case of the secondary foaming preceding type foamed bead scarcely arises. However, when the secondary foaming temperature is significantly higher than the mutual fusion temperature of the foamed beads, even in the case of the fusion preceding type foamed beads, there is the case of inevitably raising the heating temperature during course of the molding process to obtain a foamed bead molded article having a good appearance. Therefore, it is preferable that the temperature at which the foamed beads are put into a fusible state be designed not to be largely different from the temperature at which the foamed beads are put into the secondary foaming state. From this fact, it is also important to adjust the foamed beads to have a crystal structure in which specified endothermic peaks appear on the high-temperature side of the main endothermic peak on the first DSC curve of the foamed beads as shown in the present invention.

The polypropylene resin foamed beads of the present invention are polypropylene resin foamed beads (hereinafter, such polypropylene resin foamed beads of the present invention are simply referred to as "polypropylene resin foamed beads") having a specific crystal structure which can be confirmed by heat flux differential scanning calorimetry as mentioned above. Specifically, the polypropylene resin foamed beads of the present invention are foamed beads having a crystal structure characterized by the feature that three or more endothermic peaks appear, a main endothermic peak exhibiting an endothermic peak calorific value of 70 to 95% of the total endothermic peak calorific value and having an apex temperature of 100 to 140° C. appears and two or more endothermic peaks on the high-temperature sides of the main endothermic peak appear on the first DSC curve obtained when 1 to 3 mg of the polypropylene resin foamed beads are heated from normal temperature (about 25° C.) to 200° C. at a heating rate of 2° C./min by heat flux differential scanning calorimetric device. The reason why the heating rate of 2° C./min is adopted in the differential scanning calorimetry of the present invention is that it is necessary to improve the ability of resolution of endothermic peaks based on hetero crystals by more decelerating the heating rate condition than usual in the heat flux differential scanning calorimetry to ascertain the presence of the crystal structure specific to the foamed beads of the present invention, that is, whether or not the foamed beads has such a specific crystal structure in which three or more endothermic peaks appear on the first DSC curve, so that the heating rate is preferably 2° C./min.

Figure 1:
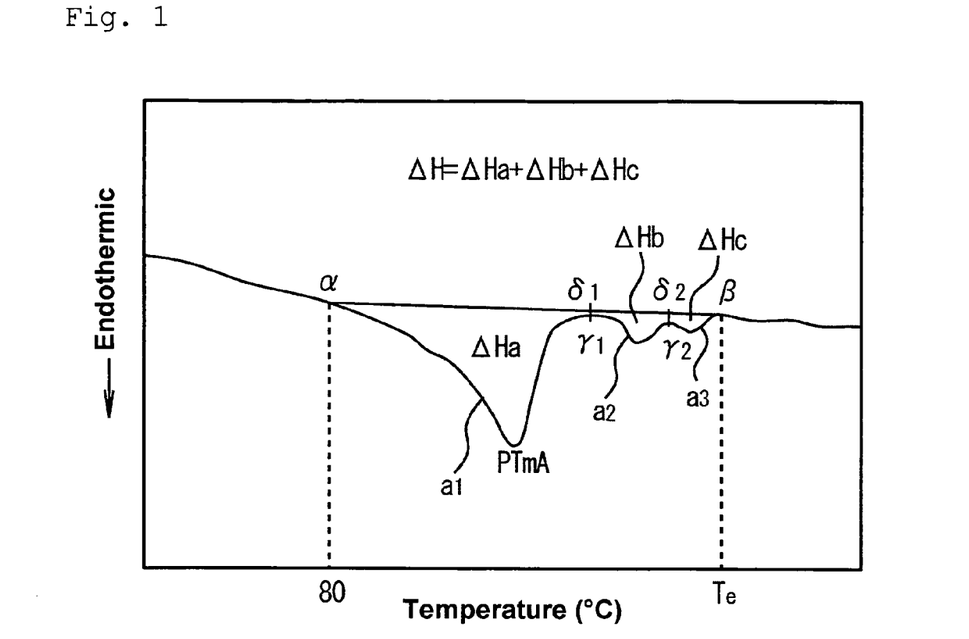
FIG. 1 shows the first DSC curve of polypropylene resin foamed beads according to the present invention and FIG. 2 shows the second DSC curve of polypropylene resin foamed beads according to the present invention.

A typical first DSC curve obtained by heating 1 to 3 mg of the polypropylene resin foam beads of the present invention by the heat flux differential scanning calorimetric device at a heating rate of 2° C./min from normal temperature to 200° C. is shown in FIG. 1. In the DSC curve shown in FIG. 1, $a_1$, $a_2$ and $a_3$ respectively show an endothermic peak.

Total endothermic peak calorific value ($\Delta H$) of the first DSC curve in the present invention is found in the following manner.

As shown in FIG. 1, a straight line ($\alpha$-$\beta$) which links the point $\alpha$ corresponding to 80° C. on the DSC curve with the point $\beta$ corresponding to the temperature Te at the completion of the melting of the resin on the DSC curve is drawn as a base line, and the calorific value corresponding to the area enclosed by the base line and the DSC curve is defined as total endothermic peak calorific value ($\Delta H$) J/g. The above peak calorific value are automatically calculated by computing using the heat flux differential scanning calorimetric device based on the peak area. In the present invention, the total endothermic peak calorific value ($\Delta H$) is preferably in a range from 40 to 120 J/g, more preferably in a range from 45 to 100 J/g and even more preferably in a range from 45 to 85 J/g.

The foamed beads of the present invention are characterized by the feature that three or more endothermic peaks appear on the first DSC curve as shown in FIG. 1 and the calorific value of each endothermic peak ($\Delta Ha$, $\Delta Hb$, $\Delta Hc$, ...) can be calculated by the partial area analytical method explained below.

The partial area analytical method will be explained based on FIG. 1. On the obtained DSC curve, a line segment ($\alpha$-$\beta$) that links the point $\alpha$ corresponding to 80° C. on the DSC curve with the point $\beta$ corresponding to the temperature Te at the completion of the melting of the resin on the DSC curve is drawn. Next, a line parallel to the ordinate of the graph is drawn from the point $\gamma_1$ which is the valley between the peak $a_1$ observed at the lowest temperature part and the peak $a_2$ adjacent to the peak $a_1$ on the DSC curve to define the point where the parallel line intersects the above line segment ($\alpha$-$\beta$) as $\delta_1$. Further, because the peak $a_3$ adjacent to the peak $a_2$ is observed, a line parallel to the ordinate of the graph is drawn from the point $\gamma_2$ which is the valley between the peak $a_2$ and the peak $a_3$ adjacent to the peak $a_2$ on the DSC curve to define the point where the parallel line intersects the above line segment ($\alpha$-$\beta$) as $\delta_2$. Then, the same procedures are repeated when the peak $a_4$, peak $a_5$, peak $a_6$ ... are observed. The line segment obtained by the above operation ($\delta_n$-$\gamma_n$) (n is an integer of 1 or more) is each peak borderline when determining the area of the endothermic peak. Then, each peak area corresponding to the calorific value of each endothermic peak is defined as the area enclosed by the DSC curve profiling the peak $a_1$, the line segment ($\delta_1$-$\gamma_1$) and the line segment ($\alpha$-$\delta_1$) in the case of the peak $a_1$, as the area enclosed by the DSC curve profiling the peak $a_2$, the line segment ($\delta_1$-$\gamma_1$), the line segment ($\delta_2$-$\gamma_2$) and the line segment ($\delta_1$-$\delta_2$) in the case of the peak $a_2$, and as the area enclosed by the DSC curve profiling the peak $a_3$, the line segment ($\delta_2$-$\gamma_2$) and the line segment ($\delta_2$-$\beta$) in the case of the peak $a_3$. Then, when the peak $a_4$, peak $a_5$, peak $a_6$ ... are observed, each peak area may be defined in the same manner as above. Then, the calorific value of each peak ($\Delta Ha$, $\Delta Hb$, $\Delta Hc$, ...) J/g can be automatically calculated by computing based on each peak area defined as above in the heat flux differential scanning calorimetric device. Also, in FIG. 1, the total endothermic peak calorific value ($\Delta H$) correspond to the sum of the calorific value of each endothermic peak ($\Delta H = \Delta Ha + \Delta Hb + \Delta Hc$).

The reason why the point a on the DSC curve is determined as the point corresponding to the temperature of 80° C. to draw the line segment ($\alpha$-$\beta$) which is the base line in the above method of measurement is that a base line drawn from the start point corresponding to 80° C. to the point corresponding to the temperature of the completion of the melting of the resin is desirable with the view of finding the calorific value of the endothermic peak stably in a well reproducible manner.

The polypropylene resin foamed beads of the present invention has a crystal structure in which a main endothermic peak having an apex temperature (PTmA) of 100 to 140° C. and exhibiting an endothermic peak calorific value of 70 to 95% of the total endothermic peak calorific value ($\Delta H$) appears on the first DSC curve. Therefore, the endothermic peak $a_1$ shows the main endothermic peak in the DSC curve of the polypropylene resin foamed beads of the present invention as shown in FIG. 1.

Also, the polypropylene resin foamed beads of the present invention have a crystal structure in which two or more endothermic peaks appear on the high-temperature side of the main endothermic peak on the first DSC curve. Therefore, the endothermic peak $a_2$ and $a_3$ existing on the high-temperature side of the main endothermic peak $a_1$ in the DSC curve of the polypropylene resin foamed beads of the present invention as shown in FIG. 1 show these two endothermic peaks $a_2$ and $a_3$.

In the present invention, the above requirement that the apex temperature (PTmA) exhibits 100 to 140° C. and the endothermic peak calorific value is 70 to 95% of the total endothermic peak calorific value ($\Delta H$) means that as to any one of the endothermic peaks having an apex temperature (PTmA) of 100 to 140° C. among three or more endothermic peaks which appear on the first DSC curve of the polypropylene resin foamed beads, the ratio (percentage) (for example, ($\Delta Ha/\Delta H$)×100 in FIG. 1) of the endothermic peak calorific value to the total endothermic peak calorific value ($\Delta H$) is 70 to 95%.

The existence of the main endothermic peak fulfilling the above requirements concerning the apex temperature and endothermic peak calorific value enables a sufficient drop in molding temperature in the molding of the foamed beads and also, can prevent deteriorations in properties such as mechanical strength and heat resistance intrinsic to polypropylene resin foamed beads molded article to be obtained in combination with the existence of two or more endothermic peaks which appear on the high-temperature side of the main endothermic peak which will be explained later. In the present invention, the endothermic peak apex temperature (PTmA) of the main endothermic peak is preferably 105 to 135° C., and more preferably 110° C. or more and less than 125° C., from the viewpoint of heat resistance and from the viewpoint of further dropping the molding temperature in the molding. Also, in the present invention, the endothermic peak calorific value of the main endothermic peak is preferably 80 to 95%, and more preferably 85 to 92% of the total endothermic peak calorific value ($\Delta H$), from the viewpoint of the balance between improvements in properties such as mechanical strength and heat resistance of the obtained foamed bead molded article and the molding ability of the foamed beads at low temperatures.

Also, the polypropylene resin foamed beads of the present invention have a crystal structure in which two or more endothermic peaks appear on the high-temperature side of the main endothermic peak on the first DSC curve of the foamed bead. The existence of two or more endothermic peaks which appear on the high-temperature side of the main endothermic peak allows the foamed beads of the present invention to form the aforementioned fusion preceding type foamed beads, bringing about excellent secondary foaming ability and excellent mutual fusibility among foamed beads in combination with the characteristics meeting the structural requirements of the above main endothermic peak. Therefore, the foamed beads of the present invention exhibit good molding ability and are molded in a wide heating temperature range by molding. The above heating temperature range is the steam heating temperature range in which a foamed bead molded article superior in appearance and mutual fusibility of the foamed beads among them is obtained.

Though it is possible to obtain the two or more endothermic peaks which appear on the high-temperature side of the main endothermic peak by making full use of the mixture of plural polypropylene resins and by making full use of the polymerization catalyst and polymerization condition, foamed beads having two or more endothermic peaks on the high-temperature side of the main endothermic peak can be formed firmly and easily by an isothermal crystallization operation explained below (operation of recrystallizing by keeping the foamed beads at a temperature close to the melting point of the foamed beads for a predetermined time) in addition to the use of a mixture of plural polypropylene resins. In the case where these two or more endothermic peaks which appear on the high-temperature side of the main endothermic peak have the crystal structure formed in the foamed beads by the mixture of plural polypropylene resins and isothermal crystallization operation, these two or more endothermic peaks are divided into an endothermic peak derived from a propylene type resin component forming the main endothermic peak of the polypropylene resin foamed beads among polypropylene resin mixtures and endothermic peaks derived from other propylene resin components.

Among the above two or more endothermic peaks, the endothermic peak derived from a propylene resin component forming the main endothermic peak can be formed by the isothermal crystallization operation of the propylene resin forming the main endothermic peak in the process of producing the foamed beads. It can be confirmed that these two or more endothermic peaks which appear on the high-temperature side of the main endothermic peak include endothermic peaks (hereinafter also referred to as a high-temperature peak) derived from propylene resin components forming the main endothermic peak and endothermic peaks derived from other propylene resin components among the polypropylene resins, by the following heat flux differential scanning calorimetric method of polypropylene resin foamed beads.

Figure 2:
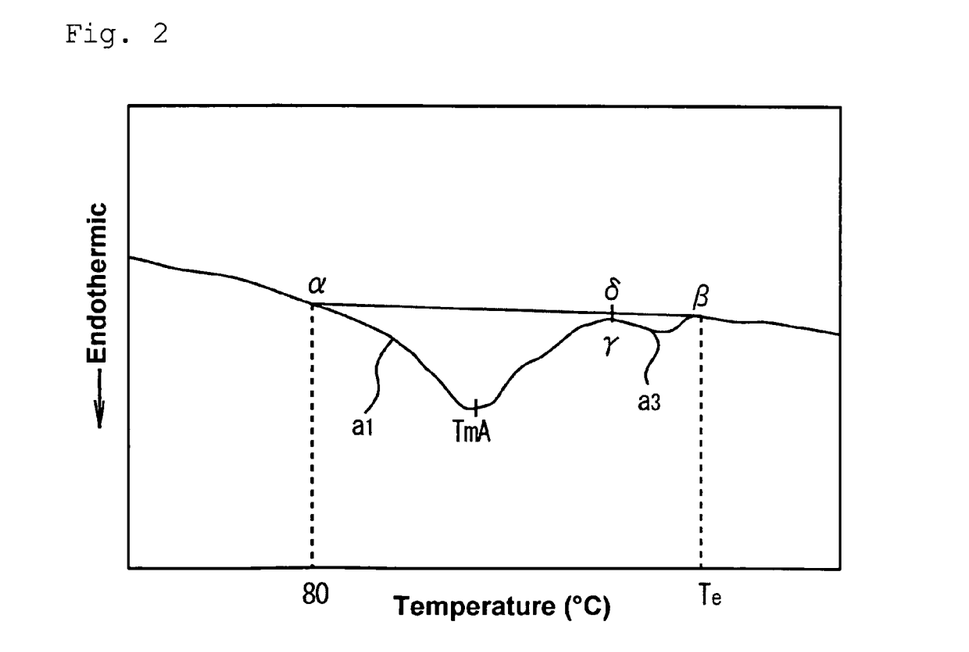

1 to 3 mg of the polypropylene resin foamed beads are heated at a heating rate of 2° C./min from normal temperature (around 25° C.) to 200° C. by the heat flux differential scanning calorimetric device to obtain the first DSC curve. Then, the resin foamed beads are cooled at a cooling rate of 2° C./min from 200° C. to 25° C. immediately after they reach a temperature of 200° C., and then heated at a heating rate of 2° C./min from 25° C. to 200° C. immediately after they reach a temperature of 25° C. to obtain the second DSC curve. In the case of polypropylene resin foamed beads characterized by the feature that two or more endothermic peaks which appear on the high-temperature side of the main endothermic peak are formed by the mixture of plural polypropylene resins and isothermal crystallization operation among the polypropylene resin foamed beads of the present invention, two or more endothermic peaks appear on the high-temperature side of the main endothermic peak on the first DSC curve obtained by the above method. However, the number of endothermic peaks existing on the high-temperature side of the main endothermic peak is reduced on the second DSC curve obtained by the above method (however, one or more endothermic peaks on the high-temperature side of the main endothermic peak exist). Then, from a comparison between the first DSC curve and the second DSC curve, it can be confirmed that at least one endothermic peak among two or more endothermic peaks existing on the high-temperature side of the main endothermic peak and appearing on the first DSC curve disappears on the second DSC curve. It is thus found from this comparison that the endothermic peak which has disappeared is an endothermic peak derived from the propylene resin component forming the main endothermic peak and the endothermic peaks remaining on the high-temperature side of the main endothermic peak are endothermic peaks derived from other propylene resin components. For example, on the first DSC curve of the foamed beads of the present invention as shown in FIG. 1, two endothermic peaks $a_2$ and $a_3$ appear on the high-temperature side of a main endothermic peak $a_1$. Then, on the second DSC curve of the foamed beads as shown in FIG. 2, only one endothermic peak $a_3$ appears on the high-temperature side of a main endothermic peak, showing that the endothermic peak $a_2$ disappears. In this case, the endothermic peak $a_2$ which has disappeared is an endothermic peak derived from a propylene resin component forming the main endothermic peak and the endothermic peak $a_3$ is an endothermic peak derived from other propylene resin component.

The reason why the cooling rate from 200° C. to 25° C. is set to 2° C./min when the second DSC curve is obtained and the reason why the heating rate from 25° C. to 200° C. is set to 2° C./min when the second DSC curve is obtained by the differential scanning calorimetry in the present invention are that the ability of resolution of endothermic peak is improved based on hetero crystals to measure, as mentioned in the reason why the heating rate is set to 2° C./min when the first DSC curve is obtained, that it is necessary to adopt the same measurement condition to compare the first DSC curve with the second DSC curve and also, that too low cooling rate is undesirable.

The polypropylene resin foamed beads of the present invention which have a crystal structure exhibiting the thermal characteristics shown by the first DSC curve can be molded under a low heating steam pressure and a molded article obtained from the polypropylene resin foamed beads bear comparison with current polypropylene resin foamed beads molded article in mechanical property.

The endothermic peak calorific value of a high-temperature peak among two or more endothermic peaks existing on the high-temperature side of the main endothermic peak on the first DSC curve of the polypropylene resin foamed beads of the present invention is preferably 2 to 15 J/g, and more preferably 3 to 12 J/g. When the endothermic peak calorific value is adjusted to the above range, the heating temperature condition of the foamed beads during the course of molding is reduced, to thereby form excellent foamed beads from the viewpoint of producing a foamed bead molded article superior in dimensional stability and mechanical property.

With regard to methods other than the isothermal crystallization operation, even in the case where foamed beads having a crystal structure having two or more endothermic peaks on the high-temperature side of the main endothermic peak are obtained by, for example, the method in which plural polypropylene resins differing in melting point are mixed without performing the isothermal crystallization operation, the endothermic peak calorific value of the lowest-temperature side endothermic peak among two or more endothermic peaks which appear on the high-temperature side of the main endothermic peak is adjusted by changing mixing ration of plural polypropylene resins having different melting points so as to be in a range preferably from 2 to 15 J/g, and more preferably from 3 to 12 J/g from the same reason as that mentioned to adjust the calorific value of the high-temperature peak.

In the present invention, as the method of adjusting the endothermic peak calorific value of the high-temperature peak among two or more endothermic peaks which appear on the high-temperature side of the main endothermic peak, to the above range, an adjusting method carried out by the isothermal crystallization operation in the production of foamed beads as will be explained later is preferable with the view of obtaining a foamed bead molded article having stable mechanical properties.

The melting point of the base resin of the polypropylene resin foamed beads of the present invention is a value measured by a heat flux DSC measuring device according to the method described in JIS K7121 (1987) "the case of measuring the melting temperature after predetermined heat treatment". When plural endothermic peaks exist on the DSC curve, the apex temperature of an endothermic peak having the largest area is adopted.

Because the melting point of the base resin of the polypropylene resin foamed beads of the present invention is close to the apex temperature (TmA) of the main endothermic peak on the second DSC curve as shown in FIG. 2 and to the apex temperature (PTmA) of the low-temperature side main endothermic peak on the first DSC curve as shown in FIG. 1, the melting point of the base resin may be estimated from TmA or PTmA.

Any polypropylene polymer may be used as the base resin constituting the polypropylene resin foamed beads in the present invention whether it is a propylene homopolymer, propylene block copolymer or propylene random copolymer insofar as it can form the crystal structure specific to the polypropylene resin foamed beads of the present invention. Examples of the above propylene copolymer include copolymers of propylene and ethylene or/and α-olefins having 4 to 20 carbon atoms, for example, copolymers of propylene and ethylene, 1-butene, 1-pentene, 1-hexene, 1-octene or 4-methyl-1-butene. The above propylene copolymer may be a binary copolymer such as a propylene/ethylene random copolymer and propylene/butene random copolymer or a ternary copolymer such as a propylene/ethylene/butene random copolymer. The polypropylene copolymer is preferably a polypropylene resin containing 70% by weight or more and preferably 80 to 99.5% by weight of a structural unit derived from propylene in the copolymer, and 30% by weight or less and preferably 0.5 to 20% by weight of a structural unit derived from ethylene or/and α-olefins having 4 to 20 carbon atoms.

Any polypropylene resin may be used as the polypropylene resin to be used in the present invention without any particular limitation insofar as it can form foamed beads having a specific crystal structure. However, it is preferable to use a polypropylene resin polymerized using a metallocene type polymer catalyst from the reason that foamed beads having such a crystal structure are easily obtained.

Also, the base resin which is a constituent of the polypropylene resin foamed beads in the present invention is preferably prepared by mixing plural polypropylene resins in view of obtaining polypropylene resin foamed beads having the above crystal structure. Moreover, the plural polypropylene resins to be mixed preferably have melting points differing by 25° C. or more, preferably 27° C. or more, and more preferably 30° C. or more from each other, and preferably include at least two types of resins consisting of a low-melting point polypropylene resin and a high-melting point polypropylene resin. When the difference in the melting point is designed to fall in the above range, the foam particles are easily so adjusted that they have a crystal structure having two or more endothermic peaks on the high-temperature side of the main endothermic peak on the first DSC curve of the above foamed beads among the specific crystal structures of the polypropylene resin foamed beads of the present invention. Also, when, particularly, a polypropylene resin produced using a metallocene type polymerization catalyst is selected as the low-melting point polypropylene resin and mixed with the high-melting point polypropylene resin, the melting point of a low-melting point polypropylene resin component of the mixed resin is shifted by, for example, 5° C., to the lower temperature side than the melting point of the low-melting point polypropylene resin to be used for mixing, and therefore, the heating temperature of the foamed beads obtained from the mixed resin can be more dropped in the molding.

In the present invention, the base resin constituting the polypropylene resin foamed beads is preferably constituted of a mixture of a polypropylene resin (hereinafter referred to as "polypropylene resin (A)") having a melting point of 100 to 140° C. and a polypropylene resin (hereinafter referred to as "high-melting point polypropylene resin (B)") having a melting point higher by 25° C. or more, more preferably 27° C. or more, and even more preferably 30° C. or more than the polypropylene resin (A).

The melting point of the polypropylene resin in this case is a value found in the same manner as in the method of measuring the melting point of the base resin of the aforementioned polypropylene resin foamed beads.

The above polypropylene resin (A) is preferably a random copolymer of propylene, ethylene or/and α-olefins having 4 to 20 carbon atoms in view of obtaining a polypropylene resin having a melting point of 100 to 140° C. and hence in view of obtaining a main endothermic peak having an apex temperature of 100 to 140° C. on the first DSC curve of the obtained foamed beads. Also, the above resin (A) has a melting point of 100 to 140° C., preferably 105 to 135° C., more preferably 105 to 130° C., and even more preferably 110 to 125° C., which is preferable in the point that the heating temperature can be dropped at which a good foamed bead molded article is obtained when the foamed beads obtained from a mixed resin containing the resin are molded by in-mold molding. Also, the heat resistance of the foamed bead molded article to be obtained can be secured.

When the low-melting point polypropylene resin (A) is constituted of a polypropylene resin random copolymer as mentioned above, examples of the comonomer to be copolymerized with propylene include ethylene, 1-butene, 1-pentene, 1-hexene, 1-octene and 4-methyl-1-butene. Therefore, specific examples of the resin (A) include a propylene/ethylene random copolymer, propylene/butene-1 random copolymer and propylene/ethylene/butene-1 random copolymer. Also, the content of an ethylene unit component or/and α-olefin unit components having 4 to 20 carbon atoms is preferably 0.01 to 8% by weight, and more preferably 0.05 to 5% by weight in the resin (A) from the viewpoint of melting point and mechanical strength.

As the polypropylene rein (A), a propylene/ethylene random copolymer, propylene/butene-1 random copolymer and propylene/ethylene/butene-1 random copolymer which are obtained, for example, by copolymerizing propylene with a comonomer by using the so-called metallocene type polymerization catalyst are more preferable. Also, the polypropylene resin (A) obtained using a metallocene type polymerization catalyst is highly compatible with the high-melting point polypropylene resin (B), so that it easily form the crystal structure specific to the polypropylene resin foamed beads of the present invention and is therefore given as particularly preferable example.

Examples of the high-melting point polypropylene resin (B) to be mixed with the above low-melting point polypropylene resin (A) include a propylene homopolymer, block copolymer of propylene and ethylene or/and α-olefins having 4 to 20 carbon atoms, and random copolymer of propylene and ethylene or/and α-olefins having 4 to 20 carbon atoms which is reduced in the content of comonomers.

In mixtures of the low-melting point polypropylene resin (A) and the high-melting point polypropylene resin (B) which are preferably exemplified as the structure of the base resin of the foamed beads of the present invention, for example, the mixing ratio of the both is preferably designed as follows (percentage by weight): the low-melting point polypropylene resin (A): the high-melting point polypropylene resin (B)=98 to 90:2 to 10, and preferably 95 to 92:5 to 8. This makes it possible to easily adjust the ratio of the above main endothermic peak calorific value to the total endothermic peak calorific value to 70 to 95%.

The melt flow rate (MFR) of the base resin of the foamed beads of the present invention is preferably 5 to 60 g/10 min, and more preferably 10 to 40 g/10 min. In the case where the base resin is constituted of a material containing the low-melting point polypropylene resin (A) and the high-melting point polypropylene resin (B), it is preferable to use a polypropylene resin having a MFR of 1 to 100 g/10 min and preferably 2 to 50 g/10 min as the low-melting point polypropylene resin (A), and a polypropylene resin having a MFR of 0.1 to 50 g/10 min and preferably 0.2 to 20 g/10 min as the high-melting point polypropylene resin (B). The above MFR is a value measured according to JIS K7210 (1999) in the test condition M (temperature: 230° C., load: 2.16 kg).

A mixture of the above polypropylene resins exemplified as the base resin constituting the foamed beads of the present invention is obtained by mixing at least two types of resins having the above difference in melting point by a kneader. In this case, it is important to mix the both in such a manner that the both are sufficiently uniformed. When the mixing is insufficient, it is difficult to obtain polypropylene resin foamed beads having the crystal structure required in the present invention, and particularly, polypropylene resin foamed beads having two or more endothermic peaks on the high-temperature side of the main endothermic peak on the first DSC curve. The above mixing is usually preferably made by heating both resins to a temperature at which they are melted to extrude the both by using a highly miscible extruder such as a two-shaft kneader, or by adopting a starvation miscible method as described, for example, in JP-A No. 2006-69143 to knead using a extruder. After the above kneading is fished, the kneaded product is extruded plural strands from the extruder and cut into an appropriate size to pelletize the cut product into resin pellets having a size appropriate for forming foamed beads.

The average weight per foamed bead in the present invention is usually 0.01 to 10.0 mg and preferably 0.1 to 5.0 mg. This average weight may be adjusted by a pelletizing process for obtaining resin pellets used to obtain foamed beads.

Other polymer components and additives may be formulated during the pelletizing process in the polypropylene resin constituting the base resin of the foamed beads of the present invention to the extent that the effect of the present invention is not impaired.

Examples of the above other polymer components include polyethylene resins such as a high-density polyethylene, middle-density polyethylene, low-density polyethylene, linear low-density polyethylene, linear ultra-low-density polyethylene, ethylene/vinyl acetate copolymer, ethylene/acrylic acid copolymer and ethylene/methacrylic acid copolymer; polystyrene resins such as a polystyrene and styrene/maleic acid anhydride copolymer; rubbers such as an ethylene-propylene rubber, ethylene-1-butene rubber, propylene-1-butene rubber, ethylene-propylene-diene rubber, isoprene rubber, neoprene rubber and nitrile rubber, and thermoplastic elastomers such as hydrogenated products of a styrene/diene block copolymer and styrene/diene block copolymer. These resins, rubbers and elastomers may be used in combinations of two or more. When the above other polymer components are added to the polypropylene resin, the content of these other polymer components is preferably adjusted to a total of 10 parts by weight or less based on 100 parts by weight of the polypropylene resin.

Examples of the above additives include various additives such as a cell diameter controlling agent, antistatic agent, conductivity donator, lubricating agent, antioxidant, ultraviolet absorber, flame retardant, metal deactivator, pigments, dyes, crystal nucleic agent and inorganic fillers. These materials may be formulated in the polypropylene resin constituting the foamed beads as desired. Though the content of each of these additives is different depending on the object of the addition, it is 25 parts by weight or less, preferably 15 parts by weight or less, more preferably 8 parts by weight or less, and even more preferably 5 parts by weight or less based on 100 parts by weight of the base resin.

Also, the base resin constituting the foamed beads is preferably a non-crosslinked polypropylene resin from the viewpoint of recycling characteristics and foamed bead productivity.

For the production of the foamed beads of the present invention, for example, the propylene resin pellets obtained by pelletizing using the above method and a foaming agent are dispersed in a dispersion medium such as water in a closed vessel, and the dispersion is heated under stirring to soften the resin pellets and also to impregnate the resin pellets with the foaming agent. Then, the resin pellets are discharged from the vessel to a lower pressure zone (usually, an atmospheric pressure zone) than the inside of the vessel at a temperature not less than the softening temperature of the resin pellets so as to be foamed. In this case, known foaming methods as described, for example, in each publication of JP-B No. 49-2183, JP-B No. 56-1344 or JP-B No. 62-61227 may be applied. Also, when the content inside of the closed vessel is discharged from the closed vessel to the lower pressure zone to obtain foamed beads, it is preferable to apply back pressure to the inside of the closed vessel by using the cell diameter controlling agent used or inorganic gas such as nitrogen or air to prevent the pressure in the container from being sharply dropped from the viewpoint of making the obtained foamed beads have uniformed apparent density. The dispersion medium used to disperse the resin pellets when the foamed beads are produced is not limited to water and any medium may be used as long as it does not dissolve the resin pellets. Examples of the dispersion medium other than water include ethylene glycol, glycerin, methanol and ethanol. Generally, water is used.

In the above method, a dispersing agent such as inorganic materials which are sparingly soluble in water, for example, aluminum oxide, calcium triphosphate, magnesium pyrophosphate, zinc oxide and kaolin, and a dispersing aid such as anionic surfactants, for example, sodium dodecylbenzenesulfonate and sodium alkanesulfonate are preferably dispersed according to the need in the dispersion medium so that the resin pellets are uniformly dispersed in the dispersing medium. The amount of the dispersing agent to be added in the dispersion medium when the foamed beads are produced is so designed that the ratio of the weight of the resin pellets to the weight of the dispersant (weight of the resin pellets/weight of the dispersant) is preferably 20 to 2000 and more preferably 30 to 1000. Also, the ratio (weight of the dispersing agent/weight of the dispersing aid) of the weight of the dispersing agent to the weight of the dispersing aid is preferably 1 to 500 and more preferably 5 to 100.

The average cell diameter of the foamed beads of the present invention is usually 30 to 500 μm and preferably 50 to 350 μm. The foamed beads having an average cell diameter falling in the above range is free from such a fear as to tow-stage foaming of the foamed beads which will be explained later and as to breaking of cells constituting the foamed beads during the course of molding because of the strength of a cell membrane, and exhibit a good foaming property.

The average cell diameter of the above foamed beads can be found by the following procedures based on an enlarged photograph obtained by taking a photomicrograph of the section of cells obtained by cutting the foamed bead into almost two equal parts. On the above enlarged photograph of the section of cells, four straight lines extending from the surface of the foamed bead to the opposite side surfaces of the foamed bead and crossing the center part of the section of the cells are drawn in eight directions from the center part to the surface of the foamed bead. In succession, the total number N of cells which the above four lines cross is measured. Then, the sum L (μm) of the lengths of line segments from the surface of the foamed bead to the opposite side surface of the foamed bead on each of the above four straight lines is divided by the total number N of cells to find the ratio (L/N) as the average cell diameter of the foamed beads.

Also, the above average cell diameter is increased with a rise of MFR of the base resin, a rise in foaming temperature, a reduction in the amount of the foaming agent and a reduction in the amount of the cell diameter controlling agent and therefore, foamed beads having an intended average cell diameter can be obtained by controlling these factors of variation in average cell diameter appropriately.

The method of adjusting the average cell diameter of the aforementioned foamed beads are carried out by mainly blending inorganic materials such as talc, aluminum hydroxide, silica, zeolite and borax as a cell diameter controlling agent in a ratio of 0.01 to 5 parts by weight based on 100 parts by weight of the base resin, in the base resin when the resin pellets are produced to obtain foamed beads. Because the average cell diameter is also changed depending on, for example, the foaming temperature when the above foamed beads are produced and the type and used amount of the foaming agent, it is necessary to establish the conditions by a preliminary test to obtain foamed beads having an intended average cell diameter.

The polypropylene resin foamed beads of the present invention usually has an apparent density of 10 g/L or more and 500 g/L or less. The upper limit of the apparent density of the foamed beads of the present invention is preferably 300 g/L, and more preferably 180 g/L from the viewpoint of improving the fundamental characteristics such as lightweight characteristics and shock-absorbing properties as a foaming body. If the apparent density of the foamed beads is too low on the other hand, cells are easily broken, and therefore, the lower limit of the apparent density is designed to be preferably 12 g/L and more preferably 15 g/L.

The apparent density of the foamed beads of the present invention is a value found in the following manner. Specifically, a group of foamed beads having a weight W (g) are sunk in a measuring cylinder filled with water using a wire netting to thereby find the volume V (L) of the group of foamed beads from a rise of water level and the weight of the group of foamed beads is divided by the volume of the group of foamed beads to calculate the value of W/V as the apparent density.

The foamed beads having a high-temperature peak in the present invention may be obtained in the following manner. Specifically, when resin pellets are dispersed in a dispersion medium in a closed vessel, followed by heating in the above known foaming method, the dispersion is heated to a temperature not exceeding the melt completion temperature (hereinafter also referred to as Te) of the resin pellets and the heating is stopped at a desired temperature Ta lower by 15° C. or less than the melting point (hereinafter also referred to as Tm) of the resin pellets and less than Te. Then, the dispersion is kept at the temperature Ta for a sufficient time and preferably about 10 to 60 min, and then, adjusted to a desired temperature Tb falling in a temperature range from (Tm−5° C.) to (Te+5° C.) to discharge the resin pellets from the vessel to a low-pressure zone at that temperature, thereby foaming the resin pellets. In order to keep the resin pellets at the above temperature range from (Tm−15° C.) to less than Te to form high-temperature peak, the resin pellets may be kept at two or more different temperature stages within the above temperature range or the temperature may be slowly raised for a sufficient time within the above temperature range.

The formation of the above high-temperature peak of the foamed beads and the calorific value of the high-temperature peak mainly depend on the conditions of the resin pellets when the foamed beads are produced, for example, the above temperature Ta, holding time at the temperature Ta, temperature Tb and temperature rise rate within a temperature range from (Tm−15° C.) to (Te+5° C.). The calorific value of the above high-temperature peak of the foamed beads tends to increase with descents of the temperatures Ta and Tb within the above each temperature range, with increase in the holding time within a temperature range from (Tm−15° C.) to less than Te, and with decrease in temperature rise rate within a temperature range from (Tm−15° C.) to less than Te. The above temperature rise rate is usually selected from values falling in a range from 0.5 to 5° C./min. On the other hand, the calorific value of the above high-temperature peak of the foamed beads tends to decrease with ascents of the temperatures Ta and Tb within the above each temperature range, with decrease in the holding time within a temperature range from (Tm−15° C.) to less than Te, with increase in temperature rise rate within a temperature range from (Tm−15° C.) to less than Te, and with decrease in temperature rise rate within a temperature range from Te to (Te+5° C.). If a preliminary test is repeated taking these points into account, the condition of the production of foamed beads exhibiting a desired high-temperature peak calorific value can be found. The temperature range relating to the formation of the aforementioned high-temperature peak is a proper temperature range in the case of using an inorganic type physical foaming agent as the foaming agent. Therefore, when the foaming agent is changed to an organic type physical foaming agent, the proper temperature ranges are shifted to the lower temperature side by as much as 0 to 30° C. than the above temperature ranges according to the type and amount of the foaming agent.

As the foaming agent to be used in the above method, an organic type physical foaming agent, an inorganic type physical foaming agent or a mixture of these foaming agents may be used. Examples of the organic type physical foaming agent include aliphatic hydrocarbons such as propane, butane, hexane, pentane and heptanes; alicyclic hydrocarbons such as cyclobutane and cyclohexane; halogenated hydrocarbons such as methyl chloride, ethyl chloride and methylene chloride, and dialkyl ethers such as dimethyl ether, diethyl ether and methyl ethyl ether. These compounds may be used in combinations of two or more. Examples of the inorganic type physical foaming agent include nitrogen, carbon dioxide, argon, air and water, and these compounds may be used in combinations of two or more. When the organic type physical foaming agent and the inorganic type physical foaming agent are mixed prior to use, a combination of an inorganic one and an organic one which may be optionally selected from the above organic type physical foaming agents and inorganic type physical foaming agents may be used. When a combination of an organic type physical foaming agent and inorganic type physical foaming agent is used, the inorganic type physical foaming agent is preferably contained in an amount of at least 30% by weight or more.

Among the above foaming agents, inorganic type physical foaming agents are desirable and nitrogen, air, carbon dioxide and water are more preferable in consideration of, particularly, environment. When water is used as the dispersion medium together with the resin pellets in a closed vessel when the foamed beads are obtained, the resin pellets kneaded in combination with a water absorptive resin are used, whereby water as the dispersion medium can be used efficiently as a foaming agent.

The amount of the foaming agent to be used is determined in consideration of the apparent density of the foamed beads to be intended, type of base resin, or type of foaming agent. However, the foaming agent is usually used in an amount of 5 to 50 parts by weight in the case of using an organic type physical foaming agent and in an amount of 0.5 to 30 parts by weight in the case of an inorganic type physical foaming agent based on 100 parts by weight of the resin pellets.

According to the aforementioned method, the polypropylene resin foamed beads obtained by discharging the softened resin pellets containing the foaming agent from the closed vessel to a low-pressure zone is subjected to a curing step under atmospheric pressure which is usually performed after it is discharged. Then, the foamed beads are placed in a closed tank for applying pressure and treated under pressure by gas having a pressure of 0.01 to 1 MPa (G), such as air, to adjust the pressure inside of the foamed beads to 0.01 to 0.8 MPa (G) and preferably 0.1 to 0.7 MPa (G). Then, the foamed beads are taken out from the tank and then may be heated using steam or hot air to foamed beads having a lower apparent density (this step is, hereinafter, referred to as two-stage foaming).

The foamed bead molded article of the present invention may be produced by a batch type molding method (for example, the molding methods described in the publication of JP-B No. 4-46217 and the publication of JP-B No. 6-49795) in the following manner. Specifically, the foamed beads are subjected to, as needed, a process for raising the pressure inside thereof in the same manner as in the aforementioned two-stage foaming to adjust the pressure inside of the foamed beads to 0.01 to 0.2 MPa (G). Then, the foamed beads are filled in the cavity of a conventionally known mold for thermoplastic resin foamed bead molding which can heat and cool, can also be opened or closed and can be sealed. Thereafter, steam having a saturated vapor pressure of 0.05 to 0.25 MPa (G) and preferably 0.08 to 0.20 MPa (G) is supplied to the inside of the mold to thereby heat the foamed beads, thereby expanding and fusing the foamed beads among them. Then, the obtained foamed bead molded article is cooled and is then taken out from the cavity. Also, as the method for heating using steam in the molding process, a conventionally known method in which heating methods such as one-way heating, inverse one-way heating and main heating are optionally combined can be adopted and, particularly, a method in which the foamed beads are heated by preliminary heating, one-way heating, inverse one-way heating and main heating in this order is preferable. The aforementioned saturated vapor pressure of 0.05 to 0.25 MPa (G) when the foamed beads are molded is the maximum value of the saturated vapor pressure of steam supplied to the inside of the mold in the molding process.

The foamed bead molded article of the present invention may also be produced by a continuous molding method (for example, the molding methods described in the publication of JP-A No. 9-104026, the publication of JP-A No. 9-104027 and the publication of JP-A No. 10-180888) in the following manner. Specifically, the inside pressure of the foamed beads are adjusted to the pressure of 0.01 to 0.2 MPa (G) according to the need. Then, the foamed beads are fed continuously to the inside of a mold formed by belts which are continuously carried along the top and bottom of a passage having a heating region and a cooling region and thereafter, steam having a saturated vapor pressure of 0.05 to 0.25 MPa (G) is fed to the inside of the mold when the foamed beads are passing through the heating region to thereby heat the foamed beads, thereby expanding and fusing the foamed beads among them. Then, make the foamed beads pass through the cooling region to be cooled, the obtained foamed bead molded article is then taken out from the mold to cut the foamed bead molded article into a proper length one by one.

In the molding using the polypropylene resin foamed beads of the present invention, the surfaces of the foamed beads are first put into a fusible state among them by the heating using the steam and then, the foamed beads themselves are softened and put into a secondary foamable state, so that a foamed bead molded article superior both in appearance and the mutual fusibility of the foamed beads is obtained and at the same time, a good foamed bead molded article is produced due to a wide molding temperature range even if some heating unevenness arises in the molding.

In the case of obtaining a foamed bead molded article having an apparent density of 30 g/L or less, it has been difficult to obtain a good foamed bead molded article by the conventional molding of the polypropylene resin foamed bead if the method in which foamed beads increased in its inside pressure are used to carry out molding or a method in which foamed beads having an apparent density of 20 g/L or less are produced and are filled in a significantly higher compression filling rate in a mold cavity to carry out molding is not used, though depending on the shape to be intended. However, the polypropylene resin foamed beads of the present invention are characterized by the feature that a good foamed bead molded article can be obtained without the aid of such a method or even if the pressure inside of the foamed beads is not raised more than usual.

The foamed bead molded article of the present invention has a structure in which foamed beads are tightly fused among them and therefore, exhibits high compressive strength and flexibility, is reduced in compression set, is much reduced in surface irregularities so that the molded article has a smooth surface and is also superior in dimensional stability.

The foamed bead molded article of the present invention which is produced in the above manner has an open cell rate of preferably 40% or less, more preferably 30% or less and most preferably 25% or less based on the procedures C of ASTM-D2856-70. Foamed beads having a lower open cell rate are superior in mechanical strength. Also, the apparent density of the foamed bead molded article of the present invention is preferably 10 to 300 g/L and more preferably 13 to 180 g/L from the viewpoint of mechanical strength, shock-absorbing property and light-weight characteristics. The apparent density (g/L) of the foamed bead molded article can be calculated by dividing the weight (g) of the foamed bead molded article by the volume (L) calculated from the outside dimension of the foamed bead molded article.

Examples

The present invention will be explained below by way of Examples and Comparative Examples.

The base resins used in these Examples and Comparative Examples and their natures are shown in Table 1 below.

TABLE 1

| Abbreviation | Catalyst | Type of base resin | Ethylene content (wt %) | MFR (g/10 min) | Melting point |
|---|---|---|---|---|---|
| Resin 1 | Metallocene type | Propylene/ethylene random copolymer | 1 | 7 | 142 |
| Resin 2 | Ziegler type | Propylene/ethylene random copolymer | 2.7 | 10 | 145 |
| Resin 3 | Metallocene type | Propylene/ethylene random copolymer | 2.8 | 7 | 135 |
| Resin 4 | Metallocene type | Propylene/ethylene random copolymer | 3.5 | 7 | 125 |
| Resin 5 | Ziegler type | Propylene homopolymer | 0 | 0.5 | 162 |
| Resin 6 | Ziegler type | Propylene homopolymer | 0 | 4 | 165 |
| Resin 7 | Metallocene type | Propylene/ethylene random copolymer | 3.5 | 25 | 127 |

Examples 1 to 6, Comparative Examples 1 to 6

Production of Polypropylene Resin Foamed Beads

A polypropylene resin described in Table 1 was melt and kneaded in a formulation shown in Table 2 or 3 together with 500 ppm by weight of zinc borate in the following starvation miscible operation condition by using a 65 mmφ uniaxial extruder. The kneaded product was extruded strand-wise from small holes of a nozzle attached to the end of the extruder and cooled in a water bath. The strand was cut into pieces having a weight of about 1 mg and the obtained pieces were dried to obtain resin pellets. The starvation miscible operation condition of the extruder relates to measures for kneading so that resins largely differing in melting point and melt viscosity are well dispersed by the starvation miscible method. In the general full operation condition, the amount of the resin to be discharged from the extruder is determined in the condition that the raw material supply section of the extruder is filled with a raw material resin pellet to fill the inside of the extruder with the resin, whereas in the starvation miscible operation method, the resin is supplied and extruded with controlling the amount of the resin to be discharged by a volumetric feeder such that the amount of the resin to be discharged is smaller than that discharged in the above full operation condition at the same screw rotation speed. Here, the discharge amount in the starvation miscible operation was designed to be 70% of the discharge amount in the general full operation condition.

1 kg of the resin pellets obtained above were charged together with 3 L of water as a dispersion medium in a 5 L autoclave (closed vessel) equipped with a stirrer and also, 0.3 parts by weight of kaolin, 0.004 parts by weight (as amount of active ingredient) of a surfactant (trade name: NEOGEN S-20, manufactured by Dai-ichi Kogyo Seiyaku Co., Ltd., sodium alkylbenzenesulfonate) and 0.01 parts by weight of aluminum sulfate were added as dispersants in the dispersion medium. 8 parts by weight of carbon dioxide gas was introduced as a foaming agent under pressure into the autoclave and the mixture was heated to the foaming temperature shown in Tables 2 and 3 under stirring. Then, the mixture was kept at this temperature for 15 minutes to adjust the high-temperature peak calorific value and the resulting mixture was then discharged under an atmosphere pressure to obtain foamed beads having an apparent density of 72 g/L. The above parts by weight indicate parts by weight based on 100 parts by weight of the resin pellets.

(Production of a Foamed Molded Article)

The foamed beads obtained above were filled in a mold having 250 mm length×200 mm width×50 mm thickness to carry out molding by using steam heating under the molding condition shown in Table 2 or 3 to obtain a plate-like foamed molded article. The obtained foamed molded article was cured in a 80° C. oven for 12 hours to obtain a polypropylene resin foamed bead molded article.

The ratio of each polypropylene resin to be mixed, foaming temperature when the foamed beads are produced, pressure in the autoclave when the resin pellets is discharged and foamed, apparent density of the foamed beads, endothermic peak calorific value and peak apex temperature on the first DSC curve of the foamed beads, molding condition and results of evaluation of the foamed bead molded article are shown in Tables 2 and 3.

TABLE 2

| | | Unit | Example 1 | Example 2 | Example 3 | Example 4 | Example 5 | Example 6 |
|---|---|---|---|---|---|---|---|---|
| Resin | Resin 1 | wt % | | | | | | |
| | Resin 2 | wt % | | | | | | |
| | Resin 3 | wt % | | 95 | | | 95 | |
| | Resin 4 | wt % | 95 | | 97.5 | 92.5 | | |
| | Resin 5 | wt % | 5 | 5 | 2.5 | 7.5 | | |
| | Resin 6 | wt % | | | | | 5 | 10 |
| | Resin 7 | wt % | | | | | | 90 |
| Foaming temperature | | ° C. | 144 | 146 | 135 | 148 | 136 | 156 |
| Pressure in the autoclave when the resin is foamed | | MPa (G) | 2.8 | 2.8 | 2.6 | 2.8 | 3.6 | 2.5 |
| Apparent density of the foamed bead | | g/L | 72 | 72 | 72 | 72 | 72 | 72 |
| Melting calorific value of the foamed beads and endothermic peak apex temperature | Whole | J/g | 52.3 | 78.1 | 56 | 58.7 | 63.9 | 68.8 |
| | Main endothermic peak, Numerals in ( ) show the apex temperature | J/g (° C.) | 47.2 (122.7) | 67.9 (134.1) | 50.5 (122.1) | 48.7 (122.7) | 46.9 (124.9) | 55.3 (124.5) |
| | Endothermic peak on the high-temperature side of the main endothermic peak (low-temperature side of two peaks): high-temperature peak, Numerals in ( ) show the apex temperature | J/g (° C.) | 3.7 (148.9) | 9.2 (152.7) | 4.4 (140.4) | 5.2 (149.9) | 14.9 (150.3) | 4.1 (151.7) |
| | Endothermic peak on the high-temperature side of the main endothermic peak (high-temperature side of two peaks), Numerals in ( ) show the apex temperature | J/g (° C.) | 1.4 (160.2) | 1.0 (162.0) | 1.1 (159.8) | 4.8 (162.3) | 2.1 (161.1) | 9.4 (163.6) |
| Lower limit of the pressure of molding heating steam | | MPa (G) | 0.1 | 0.18 | 0.11 | 0.13 | 0.18 | 0.12 |
| Apparent density of the foamed bead molded article | | g/L | 50 | 50 | 50 | 50 | 50 | 50 |
| Evaluation of the foamed bead molded article | Secondary expanding characteristics | | ○ | ○ | ○ | ○ | ○ | ○ |
| | Fusibility | | ○ | ○ | ○ | ○ | ○ | ○ |
| | Flexibility | | ○ | ○ | ○ | ○ | ○ | ○ |
| | Compressive strength | | ◎ | ◎ | ◎ | ◎ | ◎ | ◎ |

TABLE 3

| | | Unit | Comparative Example 1 | Comparative Example 2 | Comparative Example 3 | Comparative Example 4 | Comparative Example 5 | Comparative Example 6 |
|---|---|---|---|---|---|---|---|---|
| Resin | Resin 1 | wt % | 100 | | 80 | 5 | | |
| | Resin 2 | wt % | | 100 | | | 90 | 10 |
| | Resin 3 | wt % | | | | 95 | | |
| | Resin 4 | wt % | | | | | | 90 |
| | Resin 5 | wt % | | | | | 10 | |
| | Resin 6 | wt % | | | 20 | | | |
| Foaming temperature | | ° C. | 147 | 151 | 161 | 147 | 156 | 141 |
| Pressure in the autoclave when the resin is foamed | | MPa (G) | 2.6 | 2.5 | 2.5 | 2.8 | 2.8 | 2.8 |

TABLE 3-continued

| | Unit | Comparative Example 1 | Comparative Example 2 | Comparative Example 3 | Comparative Example 4 | Comparative Example 5 | Comparative Example 6 |
|---|---|---|---|---|---|---|---|
| Apparent density of the foamed bead | g/L | 72 | 72 | 72 | 72 | 72 | 72 |
| Melting calorific value of the foamed beads and endothermic peak apex temperature — Whole | J/g | 86.6 | 89.6 | 92.8 | 74.5 | 87.6 | 67.5 |
| Main endothermic peak, Numerals in ( ) show the apex temperature | J/g (° C.) | 68.5 (142.4) | 73.7 (140.5) | 65.0 (143) | 69.0 (138.2) | 73.3 (145.2) | 61.5 (123.1) |
| Endothermic peak on the high-temperature side of the main endothermic peak: high-temperature peak (low-temperature side), Numerals in ( ) show the apex temperature | J/g (° C.) | 18.1 (152.7) | 15.9 (156.6) | 27.8 (168.3) | 5.5 (154.2) | 14.3 (165.5) | 7.0 (153.6) |
| Endothermic peak on the high-temperature side of the main endothermic peak (high-temperature side), Numerals in ( ) show the apex temperature | J/g (° C.) | The second endothermic peak is not observed on the high-temperature side of the main endothermic peak. | | | | | |
| Lower limit of the pressure of molding heating steam | MPa (G) | 0.24 | 0.26 | 0.28 | 0.22 | 0.26 | 0.20 |
| Apparent density of the foamed bead molded article | g/L | 50 | 50 | 50 | 50 | 50 | 50 |
| Evaluation of the foamed bead molded article — Secondary expanding characteristics | | ○ | ○ | ○ | ○ | ○ | ○ |
| Fusibility | | ○ | ○ | ○ | ○ | ○ | ○ |
| Flexibility | | X | X | X | X | X | X |
| Compressive strength | | ◎ | ◎ | ◎ | X | ○ | ○ |

The polypropylene resin foamed beads of the present invention which are obtained in each of Examples 1 to 6 shown in Table 2 could produce a foamed bead molded article superior in secondary foaming characteristics and fusibility by using heating steam having a pressure less than 0.2 MPa (G) which is lower than that used in the case of usual polypropylene resin foamed beads. Also, the molded article exhibited excellent compressive strength and good flexibility.

Among the foamed beads of Comparative Examples in Table 3, those of Comparative Examples 1 and 2 respectively use one type of polypropylene resin as the base resin, and those of Comparative Examples 3 to 6 respectively use a mixture of two types of polypropylene resins as the base resin. The foamed beads of Comparative Examples 1 and 2 each have the main endothermic peak having a too high apex temperature and have only one endothermic peak on the high-temperature side of the main endothermic peak. Also, the lower limit of the pressure of heating steam used in the molding of the foamed beads of Comparative Examples 1 and 2 was higher than in the case of using the foamed beads of the present invention. Though Comparative Examples 1 and 2 were different from each other in the ratio of the calorific value of the main endothermic peak to the total endothermic peaks, it is found that in the case where the apex temperature of the main endothermic peak is too high and only one endothermic peak is observed on the high-temperature side of the main endothermic peak, the pressure of heating steam in the molding is increased regardless of the ratio.

The foamed beads of Comparative Examples 3 and 5 each have a main endothermic peak having a too high apex temperature and each have only one endothermic peak on the high-temperature side of the main endothermic peak, and the lower limit of the pressure of heating steam in the molding is higher than in the case of the foamed beads of the present invention. The foamed beads of Comparative Examples 3 and 5 correspond to the foamed beads of Comparative Examples 1 and 2 respectively, except that a mixture of two types of polypropylene resins is used as the base resin. It is found from the above facts that even if a mixture of two types of polypropylene resins is simply used as the base resin, the apex temperature of the main endothermic peak is too high and that when only one endothermic peak is observed on the high-temperature side of the main endothermic peak, the pressure of heating steam in the molding is high.

The foamed beads of Comparative Example 4 satisfy the structural requirements of the foamed beads of the present invention except that two or more endothermic peaks do not appear on the high-temperature side of the main endothermic peak. However, the lower limit of the pressure of heating steam in the molding was higher than in the case of the foamed beads of the present invention. Also, the calorific value of only one endothermic peak existing on the high-temperature side of the main endothermic peak was small, bringing about reduced compressive strength.

The foamed beads of Comparative Example 6 were constituted of a base resin containing a low-melting point polypropylene resin as the main component and the apex temperature of the main endothermic peak was as low as 123.1° C. However, the foamed beads had only one endothermic peak on the high-temperature side of the main endothermic peak same as Comparative Example 4 and therefore, produced an unsatisfactory effect on a reduction in the pressure of heating steam in the molding.

In the case of the foamed beads of Comparative Examples 1 to 6, the lower limit of the pressure of heating steam in the molding was higher than in the case of the foamed beads of the present invention. Further, the foamed beads of Comparative Examples 1 to 6 were more deteriorated in flexibility than the foamed beads of the present invention.

Figure 3A:
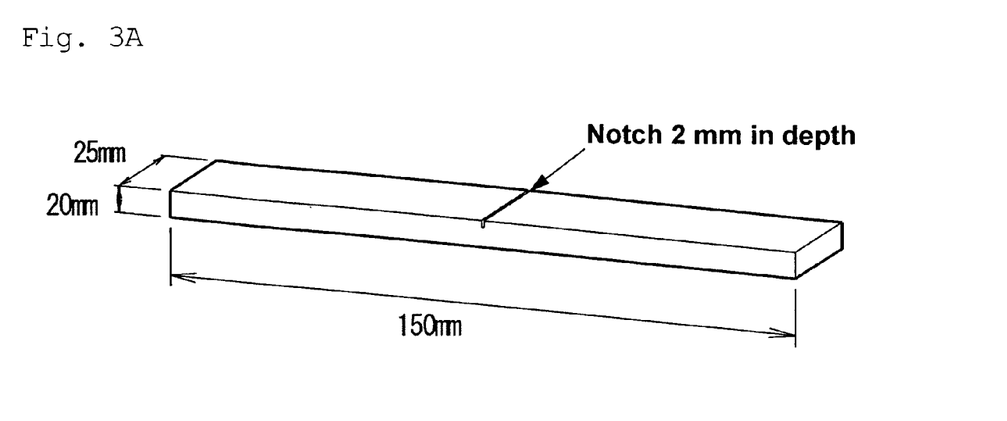
FIG. 3A shows a test piece and FIG. 3B shows a test method.
Figure 3B:
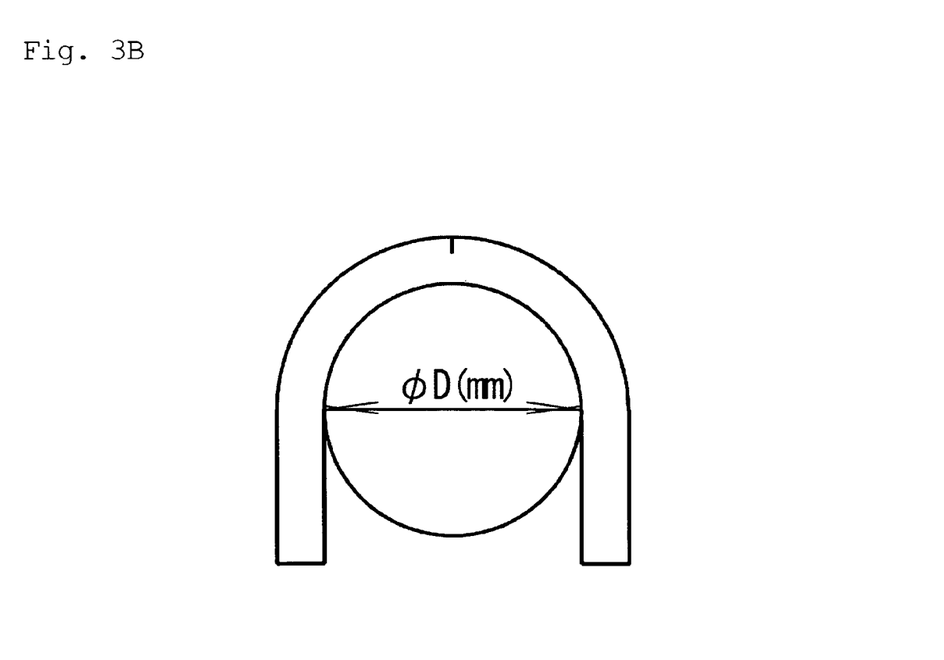

The evaluation of the foamed bead molded article in Tables 2 and 3 was made in the following manner.
(Secondary Foaming Characteristics)
The surface of the foamed bead molded article was observed by the naked eyes to evaluate according to the following standard.
○: Voids between beads are reduced on the surface of the foamed bead molded article without surface irregularities, exhibiting a good surface state.
Δ: Voids between beads and/or surface irregularities are observed a little on the surface of the foamed bead molded article.
x: Voids between beads and/or surface irregularities are significantly observed on the surface of the foamed bead molded article.
(Fusibility)
The foamed bead molded article was bent and broken to observe the broken-out section, and the number of broken foamed beads existing on the broken-out section was divided by the number of all foamed beads existing on the broken-out section to calculate the percentage of the number of broken foamed beads as the material breaking ratio (%), which was evaluated according to the following standard.
○: The material breaking ratio of the foamed bead is 70% or more when the foamed bead molded article is broken.
Δ: The material breaking ratio of the foamed bead is 30% or more and less than 70% when the foamed bead molded article is broken.
x: The material breaking ratio of the foamed bead is less than 30% when the foamed bead molded article is broken.
(Flexibility)
A test for flexibility was made as follows. Specifically, a 25 mm width×150 mm length×20 mm thickness test piece shown in FIG. 3A was cut from the foamed bead molded article and a notch 2 mm in depth was formed on the center in the direction of the length of the test piece all over the width. This test piece was allowed to stand in the circumstance of 23° C. and 50% RH for 2 hours and then, an operation of winding this test piece around a cylinder with the notch part facing outward under this circumstance (FIG. 3B) was carried out. The cylinder was exchanged with a cylinder having a smaller diameter and the above operations were repeated and the diameter of the cylinder was gradually decreased to carry out the same operation, thereby finding a cylinder diameter (D mm) at which the test piece was broken, to determine the flexibility according to the following standard.
○: The diameter of the cylinder at which the foamed bead molded article is broken in the flexibility test is less than 40 mm.
x: The diameter of the cylinder at which the foamed bead molded article is broken in the flexibility test is 40 mm or more.
(Compressive Strength)
A 50 mm length×50 mm width×25 mm thickness test piece shown was cut from the foamed bead molded article and subjected to a compressive test in the condition of a compressive speed of 10 mm/min according to JIS K6767 (1999) to find the 50% compressive stress of the foamed bead molded article, thereby evaluating according to the following standard.
⊚: The 50% compressive stress of the foamed bead molded article was 300 MPa or more.
○: The 50% compressive stress of the foamed bead molded article was 275 MPa or more and less than 300 MPa.
x: The 50% compressive stress of the foamed bead molded article was less than 275 MPa.

INDUSTRIAL APPLICABILITY

The polypropylene resin foamed bead of the present invention ensures that its moldable temperature range in the molding is more broadened towards the lower-temperature side than that of usual polypropylene resin foamed beads and that it is superior in secondary foaming ability and mutual fusibility among foamed beads. The polypropylene resin foamed beads of the present invention enables the molding, which is scarcely attained using usual polypropylene resin foamed beads, that is, the molding at a low heating temperature, and specifically, by heating using steam having a low saturated vapor pressure, which, for example, makes it possible to lower the clamping pressure of a molding machine and to reduce the thickness of a mold, ensuring that the molding machine and mold can be designed to meet application requirements for low-pressure molding. Therefore, according to the polypropylene resin foamed beads of the present invention, the economical design of the molding equipment may be ensured and a molded article can be obtained by heating using steam having a lower pressure than in the case of the molding of a conventional polypropylene resin foamed beads, and it is therefore possible to remarkably reduce the energy cost in the molding process.

The invention claimed is:
1. A polypropylene resin foamed bead having a crystal structure which indicates a main endothermic peak exhibiting an endothermic peak calorific value of 80 to 95% of the total endothermic peak calorific value and having an apex temperature of 105 to 135° C. and two or more endothermic peaks on the high-temperature sides of the main endothermic peak on the first DSC curve obtained when the polypropylene resin foamed bead is heated from normal temperature to 200° C. at a temperature rise rate of 2° C./min by heat flux differential scanning calorimetry, wherein the polypropylene resin, which is a base resin constituting the polypropylene resin foamed bead, comprises:
  a low-melting point polypropylene resin having a melting point of 105 to 130° C.; and
  a high-melting point polypropylene resin having a melting point higher than that of the low-melting point polypropylene resin by 25° C. or more, wherein
  the low-melting point polypropylene resin is a copolymer of propylene and ethylene and/or an α-olefin having 4 to 20 carbon atoms, and
  the high-melting point polypropylene resin is a propylene homopolymer.
2. The polypropylene resin foamed bead according to claim 1, wherein the apex temperature of said main endothermic peak is 110° C. or more and less than 125° C.
3. The polypropylene resin foamed bead according to claim 1, wherein the polypropylene resin constituting said polypropylene resin foamed bead comprised of a polypropylene resin produced by polymerizing using a metallocene type polymerization catalyst.
4. The polypropylene resin foamed bead according to claim 1, wherein among the base resins constituting said polypropylene resin foamed bead, the low-melting point polypropylene resin is polymerized by using a metallocene type polymerization catalyst.
5. The polypropylene resin foamed bead according to claim 1, wherein the mixing ratio by weight of the low-melting point polypropylene resin to the high-melting point polypropylene resin which are the base resins constituting said polypropylene resin foamed beads is 98/2 to 90/10.

6. The polypropylene resin foamed bead according to claim 1, wherein among the two or more endothermic peaks which appear on the high-temperature side of said main endothermic peak, the endothermic calorific value of the endothermic peak derived from the propylene resin component forming the main endothermic peak is 2 to 15 J/g.

7. A polpropylene resin foamed beads molded article produced by molding the polypropylene resin foamed beads according to claim 1.

8. A method of molding a polypropylene resin foamed bead comprising:
  molding the polypropylene resin foamed bead under a steam pressure of 0.18 MPa,
  wherein:
    the polypropylene resin foamed bead has a crystal structure that indicates a main endothermic peak and two or more endothermic peaks on a high-temperature side of the main endothermic peak on a first DSC curve,
    the main endothermic peak exhibits an endothermic peak calorific value of 80 to 95% of a total endothermic peak calorific value and has an apex temperature of 105 to 135° C.,
    the DSC curve is obtained when the polypropylene resin foamed bead is heated from a normal temperature to 200° C. at a temperature rise rate of 2° C./min by heat flux differential scanning calorimetry, and
    a base resin constituting the polypropylene resin foamed bead comprises:
      a low-melting point polypropylene resin, which is a copolymer of polypropylene and ethylene and/or an α-olefin having 4 to 20 carbon atoms, having a melting point of 105 to 130° C.; and
      a high-melting point polypropylene resin, which is a propylene homopolymer, having a melting point higher than that of the low-melting point polypropylene resin by 25° C. or more.

9. The method of claim 8, wherein the apex temperature of the main endothermic peak is from 110° C. to 125° C.

10. The method of claim 8, wherein the polypropylene resin constituting comprises a polypropylene resin produced by polymerization using a metallocene type polymerization catalyst.

11. The method of claim 8, wherein the low-melting point polypropylene is polymerized by using a metallocene type polymerization catalyst.

12. The method of claim 8, wherein a mixing ratio by weight of the low-melting point polypropylene resin to the high-melting point polypropylene resin is 98/2 to 90/10.

13. The method of claim 1, wherein among the two or more endothermic peaks which appear on the high-temperature side of the main endothermic peak, an endothermic calorific value of an endothermic peak derived from a propylene resin component forming the main endothermic peak is 2 to 15 J/g.

14. A polypropylene resin foamed bead molded article produced by molding the polypropylene resin foamed beads made by the method according to claim 8.

15. The polypropylene resin foamed bead according to claim 1, wherein a density of the polypropylene resin foamed bead is 72 to 300 g/L.

16. The polypropylene resin foamed bead according to claim 1, wherein the total endothermic peak calorific value ($\Delta H$) is 40 to 120 J/g.

\* \* \* \* \*